United States Patent [19]

Albertson

[11] Patent Number: 4,645,876
[45] Date of Patent: Feb. 24, 1987

[54] PAY TELEPHONE

[75] Inventor: Robert V. Albertson, Wayzata, Minn.

[73] Assignee: Burd, Bartz & Gutenkauf, Minneapolis, Minn.

[21] Appl. No.: 700,475

[22] Filed: Feb. 11, 1985

[51] Int. Cl.$^4$ ............................................ H04M 17/00
[52] U.S. Cl. ...................... 379/143; 109/52; 312/245; 379/155
[58] Field of Search ................ 179/6.3 R, 189 R, 6.5, 179/14, 178, 179 R; 455/26; 109/50, 52, 45; 312/245, 101; 248/225.1, 225.2, 223.3, 222.1

[56] References Cited

U.S. PATENT DOCUMENTS

| | | | |
|---|---|---|---|
| D. 85,107 | 9/1931 | Lum | D14/61 |
| D. 87,575 | 8/1932 | Heile | D9/418 |
| D. 129,731 | 9/1941 | Luttrell | D9/418 |
| D. 152,276 | 1/1949 | Lum | D14/61 |
| D. 197,974 | 4/1964 | Dreyfuss | D14/55 |
| D. 208,359 | 8/1967 | Gilbert | D26/14 |
| D. 208,476 | 9/1967 | La Barge | D26/14 |
| D. 227,783 | 7/1973 | Janda et al. | D26/14 A |
| D. 228,785 | 10/1973 | Wollet | D26/14 A |
| D. 229,944 | 1/1974 | Eddy | D26/14 A |
| D. 232,811 | 9/1974 | Edgeington et al. | D9/224 |
| D. 253,651 | 12/1979 | Richards | D14/52 |
| D. 259,044 | 4/1981 | Schmidt | D14/56 |
| D. 261,728 | 11/1981 | Khula et al. | D9/419 |
| D. 266,927 | 11/1982 | Illium, Jr. et al. | D14/55 |
| 3,085,134 | 4/1963 | Bissonnette et al. | D14/56 |
| 3,260,338 | 7/1966 | La Barge | 179/6.3 R |
| 3,319,060 | 5/1967 | Bartley | 248/223.3 |
| 3,391,256 | 7/1968 | Nawman | 179/189 R |
| 3,784,272 | 1/1974 | Schreiber | 312/245 |
| 4,048,768 | 9/1977 | Good | 52/36 |
| 4,070,074 | 1/1978 | Rohme | 312/245 |
| 4,244,304 | 1/1981 | Read | 109/52 |
| 4,246,451 | 1/1981 | Nix | 179/146 R |
| 4,462,317 | 7/1984 | Franko et al. | 109/45 |
| 4,577,563 | 3/1986 | Sidler | 109/52 |
| 4,580,853 | 4/1986 | Hitzeroth et al. | 312/245 |

FOREIGN PATENT DOCUMENTS 2155487 11/1971 Fed. Rep. of Germany .

OTHER PUBLICATIONS

Guardcover, Inc. Booklet "Telephone Headquarters of America" North Supply Catalog, p. C-373.

Primary Examiner—Robert G. Lev
Attorney, Agent, or Firm—Burd, Bartz & Gutenkauf

[57] ABSTRACT

A pay telephone having a housing is removably mounted on a mount. The mount and housing have cooperating pins and inclined slots arranged to retain the housing on the mount and permit the housing to be lifted from the mount. Locks mounted on the housing have movable members that engage a lip secured to the mount prevent the housing from being lifted from the mount. The movable members are turned with keys to positions which permit the housing to be lifted from the mount.

24 Claims, 8 Drawing Figures

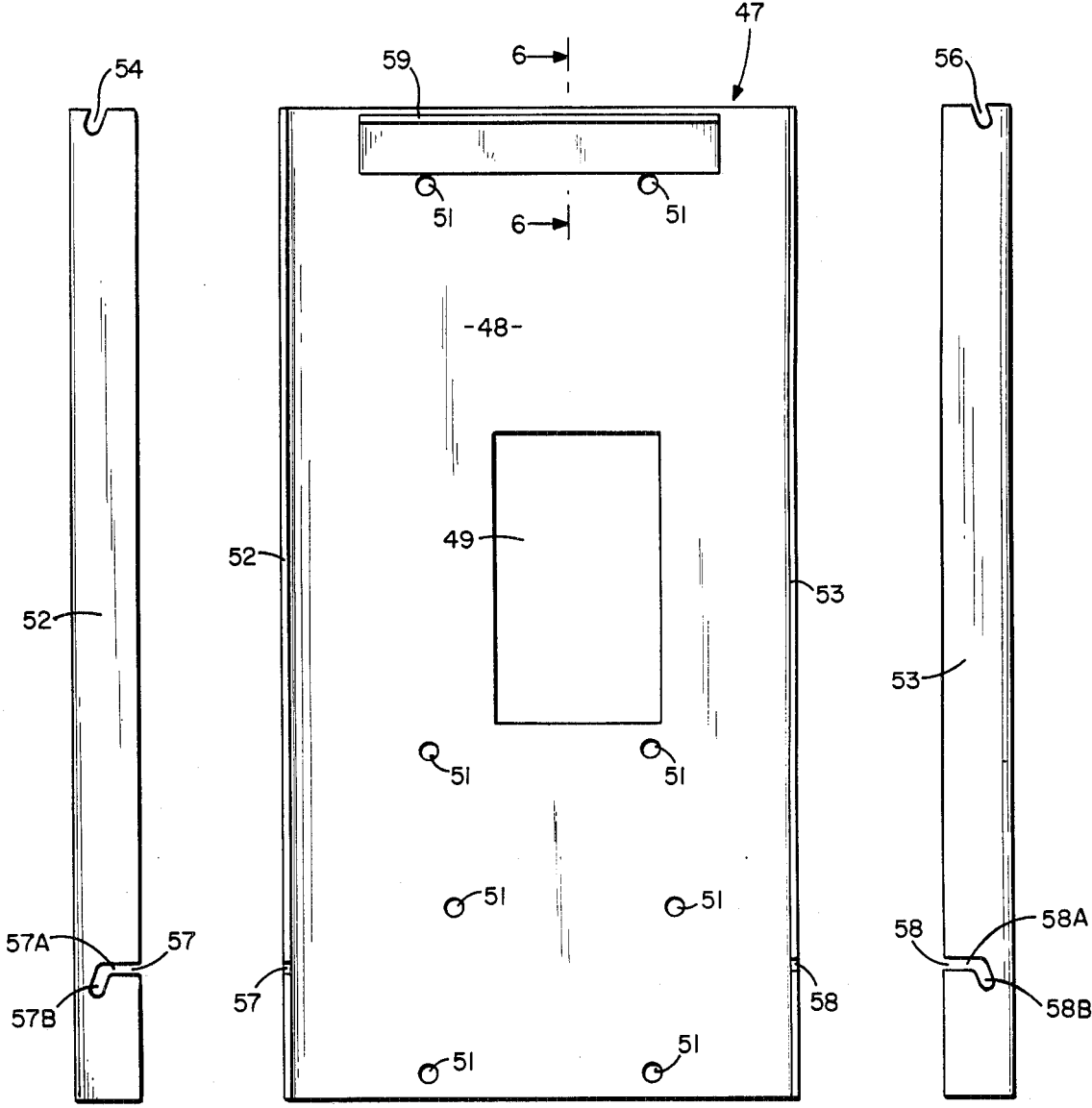
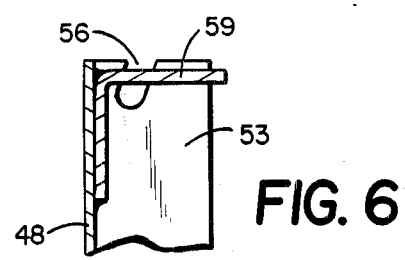
FIG. 4  FIG. 3  FIG. 5
FIG. 6

PAY TELEPHONE

FIELD OF THE INVENTION

The invention is in the field of pay telephones having cabinets accommodating the telephone unit and a box for accummulating coins.

BACKGROUND OF INVENTION

Pay telephones are used in commercial establishments and public areas to provide people with telephone service. Pay telephones have boxes that are securely fastened to a support such as a wall or special post. The boxes have internal chambers accommodating the telephone instruments except for the dials and hand pieces. Protected cords join the hand pieces to the telephone instrument. Coin mechanisms located within the boxes are used to actuate the telephone instruments and meter the operation thereof. One or more coins, upon acceptance by the coin mechanisms, are discharged and stored into coin boxes. Special keys are used to remove the coin boxes to prevent unauthorized removal of the coins. The servicing of the telephone instruments requires the removal of the entire telephone from its support and the opening of the box. The removal of the coin boxes is a separate and independent of the many servicing operations of the telephone instruments or the coin mechanisms. An example of a coin telephone is disclosed in U.S. Pat. No. 4,246,451.

SUMMARY OF INVENTION

The invention is directed to a structure for releasably mounting and locking a housing on a mount. The structure is a housing and mount assembly that includes a housing for enclosing equipment within an interior chamber. A mount is secured to a stationary support such as a wall post or the like. Releasable means on the housing and mount hold the housing on the mount. Latch means retains the housing in a nonreleasable position on the mount. The latch means is movable to a release position whereby the housing can be removed from the mount. The housing and mount assembly can be used without tools or special equipment. The interior of the housing is maintained in a secure condition when the housing is locked onto the mount.

In one form of the invention, a coin controlled telephone or pay telephone has a housing with an interior chamber accommodating the telephone unit. The telephone unit mounted to the inside of the housing has digit control means, such as a dial or numerical button actuators, operable externally of the housing. A hand piece having a conventional transmitter and receiver is coupled to the telephone unit with a cord. Coin operated switch means are mounted on the housing in alignment with a slot for directing coins into the switch means. A microprocessor located within the housing is connected to the switch means and the telephone unit for controlling the operation of the telephone unit in response to the actuation of the switch means with a coin. The microprocessor unit can be integrated into the telephone unit. A mount is adapted to be secured to a stationary support. The housing and mount have cooperating means that releasably mount the housing on the mount. Latch means hold the housing in a non-releasable position on the mount. The latch means is movable to a release position whereby the housing can be lifted from the mount.

The cooperating means on the housing and support comprise flange means on the mount that are located adjacent the inside side walls of the housing. The flange means have upper and lower inclined slots that accommodate pins secured to the housing side wall. The upper slots have upper open ends. The lower slot is a obtuse angle slot. The pins are lowered into the upper and lower slots to move the housing toward the mount and retain the housing on the mount. When the housing is lifted, the upper and lower pins are removed from the slots whereby the housing is separated from the mount. The latch means includes a transverse lip on the mount and locks having movable members mounted to the housing. Keys turn the locks to move the movable members into engagement with the lip to prevent the housing from being lifted from the mount. The keys are also used to turn the locks to release positions whereby the housing can be lifted from the mount.

DESCRIPTION OF DRAWING

FIG. 3 is an elevation view of the telephone mount;

FIG. 4 is a side view of the left side of FIG. 3;

FIG. 5 is a side view of the right side of FIG. 3;

FIG. 6 is an enlarged sectional view taken along the line 6—6 of FIG. 3;

DESCRIPTION OF PREFERRED EMBODIMENT

Figure 1:
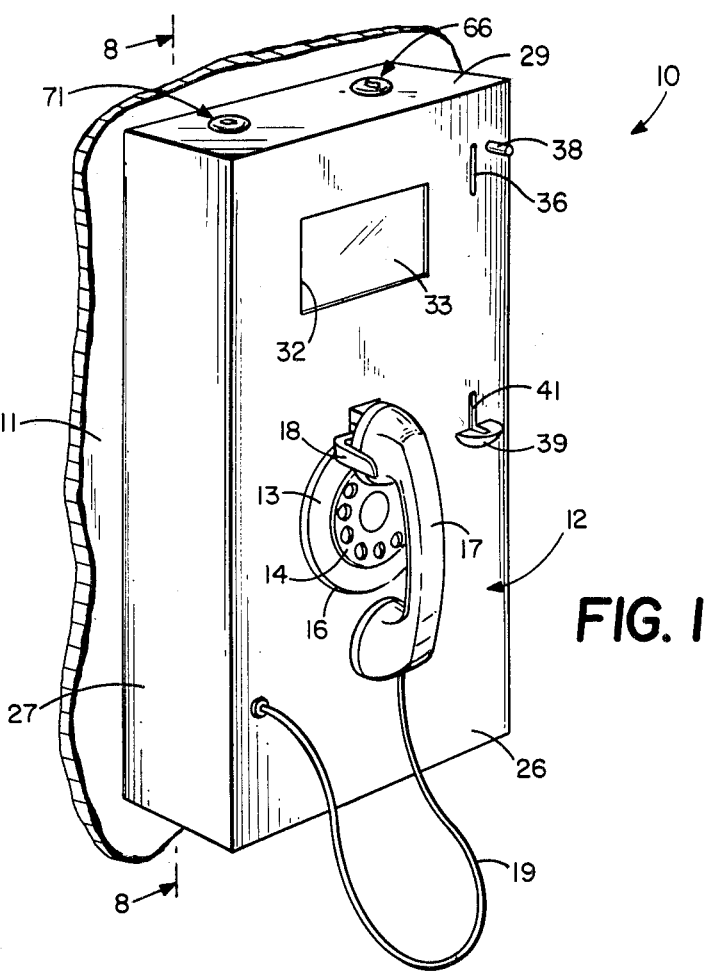
FIG. 1 is a perspective view of the pay telephone of the invention.

Referring to FIG. 1, there is shown a coin actuated telephone or pay telephone indicated generally at 10 mounted on a support 11 such as a wall of a structure. Support 11 can be part of a telephone booth or a fixed support panel or a post. Pay telephone 10 has a housing or box indicated generally at 12 supporting a telephone unit and coin actuated control for the telephone unit. A telephone unit has a telephone body 13 rotatably supporting a dial 14. Body 13 has a portion extended through a circular hole 16 in the front of housing 12. A hand piece 17 containing the conventional telephone transmitter and receiver is supported on a yoke or hanger 18 connected to the control switch for the telephone unit. A cord 19, such as an armor cord, connects hand piece 17 to the telephone body 13 within the housing 12. The telephone unit can have digital control means, such as a push button assembly in lieu of dial 14. The entire telephone circuit for the telephone unit and control therefor can be incorporated on a circuit board mounted on the housing. The microprocessor can be included in the circuit board. A push button assembly can be used to control the circuit.

Figure 7:
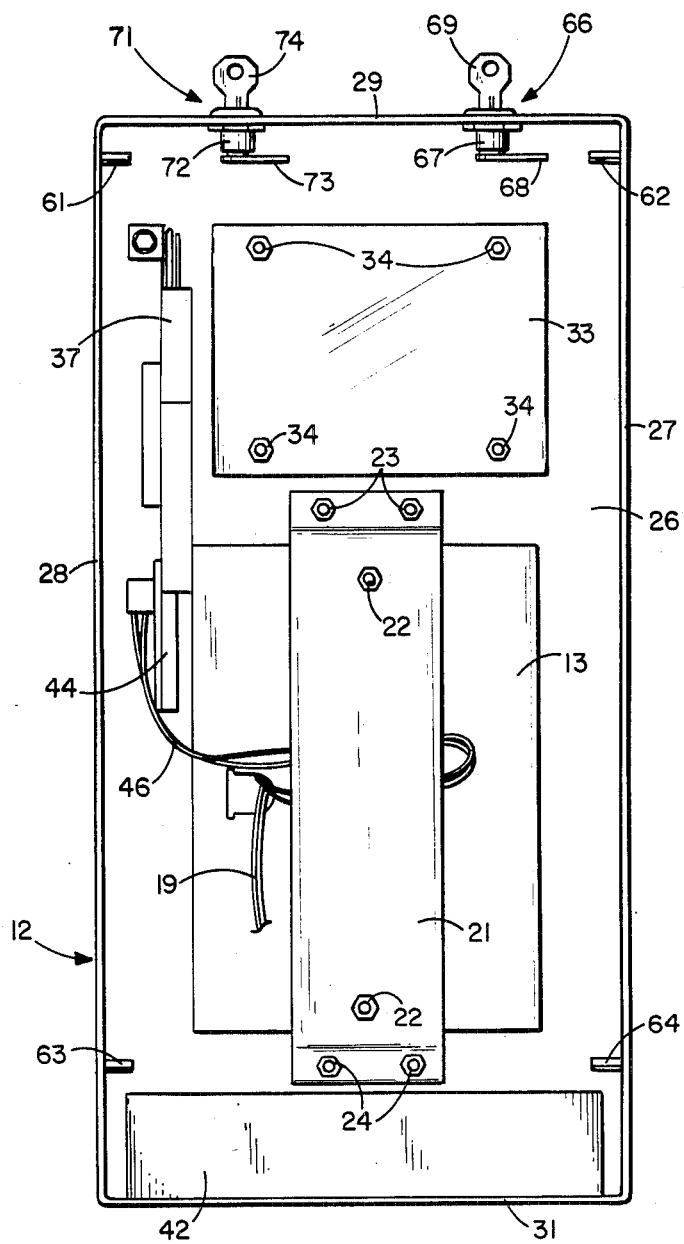
FIG. 7 is a rear elevational view of the pay telephone.

As shown in FIG. 7, telephone body 13 is mounted on housing 12 with a plate 21. A pair of nut and bolt assemblies 22 secure the base of body 13 to plate 21. Bolts 23 and 24 attach opposite ends of plate 21 to housing 12. Bolts 23 and 24 are readily removed whereby the telephone unit 13 can be removed from housing 21 for servicing or replacement.

Figure 8:
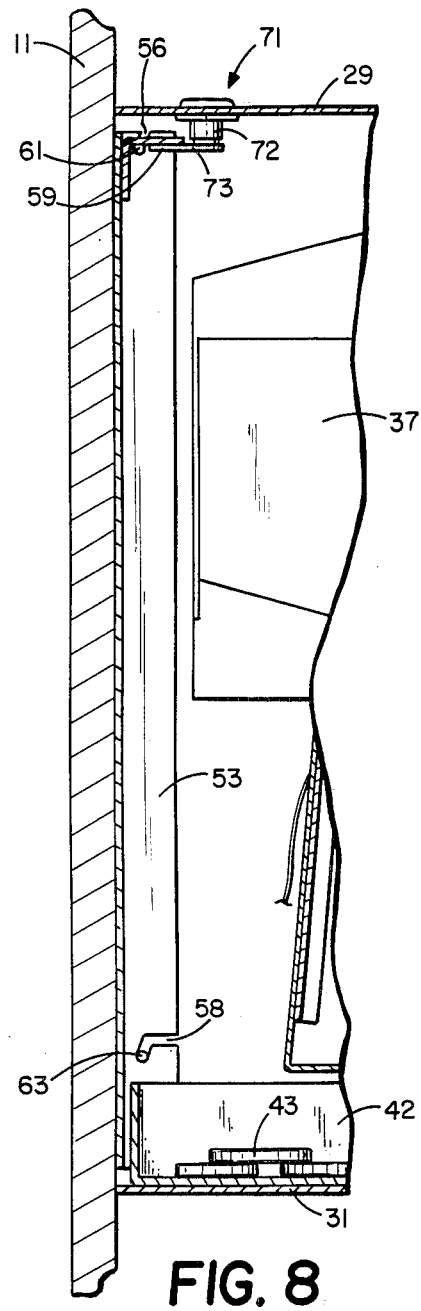
FIG. 8 is an enlarged sectional view taken along the line 8—8 of FIG. 1.

As shown in FIGS. 1 and 7, housing 12 has a generally flat upright front wall 26 joined to side walls 27 and 28 and top wall 29 and a bottom wall 31. Walls 26, 27, 28, 29, and 31 are formed into a box shape from a single piece of metal, such as stainless steel. Other materials, including plastics, can be used to make housing 12. The mid-portion of front wall 26 has the circular opening 16 for the dial portion of the telephone body 13. An information opening 32 is located above hand piece 17. A plate 33 located on the inside of front wall 26 extends over opening 32. A plurality of bolts 34 secure plate 33 to wall 26. Plate 33 can accommodate a instructional information on the operation of the pay telephone. Front wall 26 has a coin inserting or receiving slot 36 which directs the coin to coin control mechanism 37 attached to the inside of wall 26. Coin control mechanism 37 has a coin reject structure that includes a manually depressible actuator 38. The coins are returned to a coin return pocket 39 open to a coin return slot 41. The coins accepted by the coin control mechanism are deposited in a box 42 supported on bottom wall 31. As shown in FIG. 8, plurality of coins 43, such as quarters, are stored in box 42. Coin actuated mechanism 37 is coupled to a logic and control circuitry 44 for controlling the operation of the telephone unit. A line 46 couples circuitry 44 to the telephone circuit 44. The logic for the telephone unit is embodied in a microprocessor having programmed chips for local, toll, and long distance rates. The telephone unit can have a digital LED display for time and money information.

Referring to FIGS. 3 to 6, mount indicated generally at 47 attaches housing 12 to support 11. Mount 47 has a generally flat back plate 48 adapted to be secured to support 11 with a plurality of fasteners such as bolts, rivets, welds, and the like. The mid-portion of plate 48 has a hole 49 for the plugin cord used to attach the circuit of the telephone unit to the network line. A plurality of holes 51 accommodate fasteners or anchors used to attach the back plate 48 to support 11. Mount 47 has upright linear side flanges 52 and 53 joined to opposite sides of plate 48. Side flanges 52 and 53 have first upwardly open slots 54 and 56 at the upper ends thereof and second slots 57 and 58 in the lower portions thereof. The first slots 54 and 56 open in an upward direction and are inclined downwardly and rearwardly in the upper ends of flanges 52 and 53. The second slots 57 and 58 are obtuse angled slots having a horizontal outwardly open section 57A and 58A and downwardly and rearwardly directed portions 57B and 58B as shown in FIGS. 4 and 5. Slots 54 and 56 and slot portions 57B and 58B extend downwardly and rearwardly at an angle of about 20° from a vertical line. Othere angles can be used. Inclined slot portions 57B and 58B are in vertical alignment with inclined upper slots 54 and 56. The inclined slot portions 57B and 58B and inclined slots 54 and 56 located the housing close to support 11.

A transverse lock lip 59 comprising a right angle member is secured to the top of back plate 48. As shown in FIG. 6, lip 59 extends in an outward or forward direction and is located a short distance below the top edge of back plate 48. Lock lip 59 is permanently attached with welds or the like to back plate 48.

Returning to FIG. 7, a pair of first upper inwardly directed pins 61 and 62 are secured to the upper portions of side walls 28 and 27 of housing 12. Pins 61 and 62 are located in positions to enable the pins 61 and 62 to register with the upwardly open slots 54 and 56.

A pair of second pins 63 and 64 project inwardly toward each other from side walls 28 and 27 of housing 12. Pins 63 and 64 are located in positions which register with slots 57 and 58. When pins 57 and 58 are located in the bottom portions of slot sections 57B and 58B, the first pins 61 and 62 are located in the bottom portions of the upwardly directed slots 54 and 56. The pins 61, 62, 63 and 64 locate and hold housing 12 on mount 47 in tight contact with support 11.

Housing 12 is anchored to mount 47 with a pair of key operated locks indicated generally at 66 and 71. Lock 66 has a body 67 mounted on top wall 29 and a rotatable member or finger 68. A key 69 insertable to a keyhole in body 67 is operable to turn finger 68 90 degrees between an open position as shown in FIG. 7 and a latched position. Finger 68 is locatable under lock lip 59 to prevent housing 12 from being lifted and removed from the mount 47. Key operated lock 71 has a body 72 mounted on top wall 29 and a rotatable finger 73. A key 74 inserted into a keyhole in body 72 operates to rotate finger 73 90 degrees between an open position and a locked position, as shown in FIG. 8. Finger 73, when in the latch position, is located under lock lip 59. The key operated locks 66 and 71 utilized different keys to minimize the unauthorized removal of coins from coin box 42.

Figure 2:
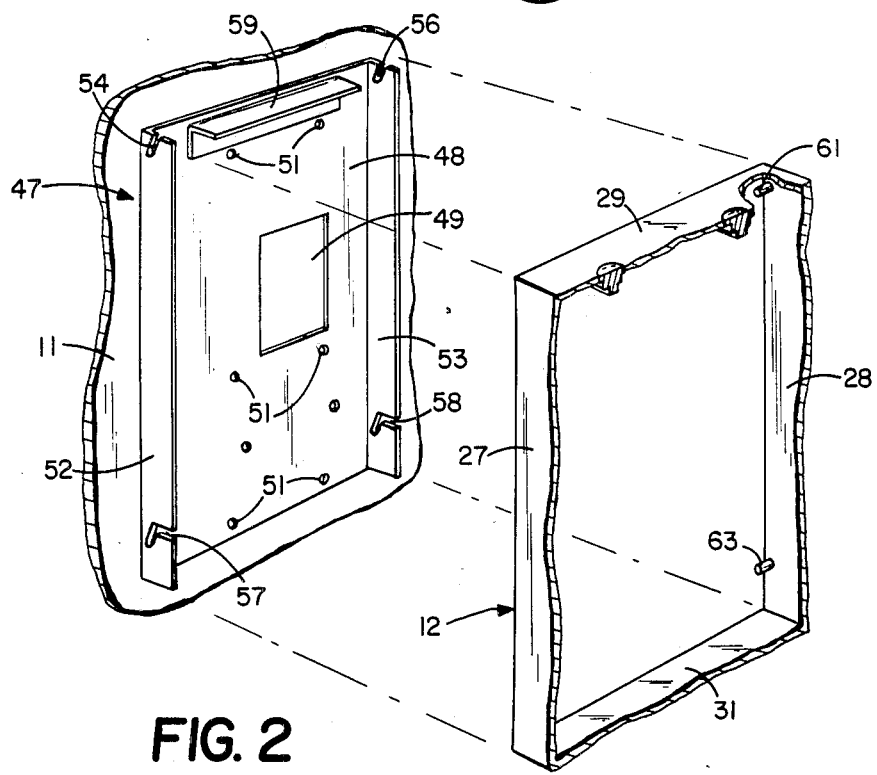
FIG. 2 is a perspective exploded view of the mounting structure of the pay telephone.

In use, mount 47 is attached to support 11. Fasteners, such as bolts and screws, are used to secure back plate 48 to the support 11. Flanges 52 and 53 located in generally upright directions with lock lip 59 at the top of mount 47 extended between the flanges, as shown in FIG. 2. Housing 12 is connected to mount 47 by aligning second pins 63 and 64 with slots 57 and 58. Housing 12 is moved in an inward direction or toward support 11 until first pins 61 and 61 are aligned with the top slots 54 and 56. The second pins 63 and 64 are aligned with the horizontal sections of the slots 57 and 58. Housing 12 is then lowered to locate pins 61 and 62 in the bottoms of slots 54 and 56 and pins 63 and 64 in the bottoms of slots 57 and 58. Housing 12 moves downwardly and inwardly into contact with support 11. The inner peripheral edges of housing 12 are located tight against support 11. Flanges 52 and 53 are located adjacent the insides of side walls 27 and 28. Tools, such as bars, screw drivers and the like, cannot be used to pry housing 12 from mount 47.

Housing 12 is retained in the mounted position by locks 66 and 71. Keys 69 and 74 are used to turn the lock fingers 68 and 73 to locked positions under lock lip 59. Housing 12 cannot be raised with lock fingers 68 and 73 are located under lock lip 59. This retains pins 61 and 62 in slots 54 and 56 and the pins 63 and 64 in the slots 57 and 58.

Housing 12 can be removed from mount 47 by unlocking the locks 66 and 71. This is accomplished with the use of keys 69 and 74. When lock fingers 68 and 73 are turned to their unlocked positions away from lock lip 59, housing 12 can be moved in an upright direction to lift first pins 61 and 62 out of slots 54 and 56 and align second pins 63 and 64 with the horizontal portions 57A and 58A of slots 57 and 58. Housing 12 is then moved in a horizontal direction away from mount 47. The back of housing 12 is open providing convenient access for servicing and replacement of the telephone unit and the removal of the coins 43 from coin box 42.

While there has been shown and described a preferred embodiment of the pay telephone and housing and mount assembly of the invention, it is understood that changes in the telephone unit, housing, and mount can be made by those skilled in the art without departing from the invention. The invention is described in the following claims.

The embodiments of the invention in which an exclusive property or privilege is claimed are defined as follows:

1. A coin controlled telephone comprising: a housing having an interior chamber, a telephone unit mounted on the housing, said telephone unit having digit control means operable externally of the housing and a hand piece including a transmitter and receiver, coin operated switch means mounted on the housing in said chamber, said housing having a slot for directing coins into the switch means, microprocessor means connected to the switch means and telephone unit for controlling the operation of the telephone unit in response to actuation of the switch means with at least one coin, a mount adapted to be secured to a stationary support, means releasably mounting the housing on the mount, said means releasably mounting the housing on the mount including slots and pin means locatable in the slots in said housing and mount said slots being inclined in a direction to locate the housing adjacent the support when the housing is mounted on the support, and latch means for holding the housing in a non-releasable position on the mount, said latch means being movable to a release position whereby the housing can be removed from the mount.

2. The telephone of claim 1 wherein: said housing has a front wall, said front wall having opening means accommodating the digit control means.

3. The telephone of claim 1 wherein: the housing has a front wall, side walls, top wall, and bottom wall forming a box shaped structure, said mount having upright side flanges located adjacent the insides of the side walls, said means releasably mounting the housing on the mount comprising upright first slots in the upper portions of the flanges and obtuse angled second slots in the lower portions of the flanges, said second slots having first horizontal sections and second downwardly directed sections, said pin means being secured to the side walls and located in said first and second slots when the housing is mounted on the mount.

4. The telephone of claim 3 wherein: said pin means comprise a pair of upper pins on the side walls located in said first slots, and a pair of lower pins secured to the side walls located in said second slots.

5. The telephone of claim 3 wherein: the latch means includes a horizontal lip secured to the mount, and lock means mounted on the housing, said lock means having a member mounted on the housing, said lock means having a member engageable with the lip to hold the housing in a non-releasable position on the mount, said member being movable to a position out of engagement with the lip whereby the housing can be removed from the mount.

6. The telephone of claim 5 wherein: the lock means comprise a pair of key operated locks, each lock having a member engageable with the lip, each member being movable to a position out of engagement of the lip whereby the housing can be removed from the mount.

7. The telephone of claim 3 wherein: each of said flanges extends substantially the length of a side wall.

8. The telephone of claim 1 wherein: said housing has upright side walls, said mount has upright side flanges located adjacent the insides of the side walls, said flanges having said slots, said pin means being secured to said side walls.

9. The telephone of claim 8 wherein: said side flanges extend substantially the length of the side walls.

10. The telephone of claim 8 wherein: said slots comprise upper slots and lower slots, each of said upper and lower slots having downwardly and rearwardly inclined portions accommodating the pin means when the housing is mounted on the mount.

11. A coin controlled telephone comprising: a housing having an interior chamber, telephone means mounted on the housing, said telephone means having digit control means operable externally of the housing and a hand piece including a transmitter and receiver, coin operated means for controlling the operation of the telephone means in response to at least one coin, a mount adapted to be secured to a stationary support, means releasably mounting the housing on the mount, said means releasably mounting the housing on the mount comprising flange means on the mount located adjacent side portions of the housing, and slots and pin means in said flange means and side portions of the housing, said pin means being located in the slots when the housing is mounted on the mount and latch means for holding the housing in a non-releasable position on the mount, said latch means being movable to a release position whereby the housing can be removed from the mount.

12. The telephone of claim 11 wherein: said slots include upright first slots in the upper portions of the flanges means, and second slots in the lower portions of the flange means, said pin means being secured to the side portions of the housing and located in said first and second slots when the housing is mounted on the mount.

13. The telephone of claim 12 wherein: said first slots extend downwardly and inwardly from the top of the flange means, and said second slots having outwardly open ends and downwardly and rearwardly slot portions cooperating with the pin means to hold the housing on the mount adjacent the support.

14. The telephone of claim 12 wherein: said pin means comprise a pair of upper pins secured to the side walls located in said first slots, and a pair of lower pins secured to the side walls located in said second slots.

15. The telephone of claim 11 wherein: the latch means includes a horizontal lip secured to the mount, and lock means mounted on the housing, said lock means having a member engageable with the lip to hold the housing in a non-releasable position on the mount, said member being movable to a position out of engagement with the lip whereby the housing can be removed from the mount.

16. The telephone of claim 15 wherein: the lock means comprise a pair of key operated locks, each lock having a member engageable with the lip, each member being movable to a position out of engagement of the lip whereby the housing can be removed from the mount.

17. The telephone of claim 11 wherein: each of said flanges means extends substantially the length of a side wall.

18. A housing and mount assembly comprising: a boxshaped housing having side walls, a mount adapted to be secured to a stationary support, means releasably mounting the housing on the mount, said means releasably mounting the housing on the mount comprising flange means on the mount located adjacent side portions of the housing, and slots and pin means in said flange means and side portions of the housing, said pin means being located in the slots when the housing is mounted on the mount, and latch means for holding the housing in a non-releasable position on the mount, said latch means being movable to a release position whereby the housing can be removed from the mount.

19. The assembly of claim 18 wherein: said means releasably mounting the housing on the mount comprises upright first slots in the upper portions of the flange means and obtuse angle second slots in the lower portions of the flange means, said second slots having first horizontal sections and second downwardly directed sections joined to the inner ends of the horizontal sections, said pin means being secured to side wall portions of the housing and located in said first and second slots when the housing is mounted on the mount.

20. The assembly of claim 19 wherein: said first slots extend downwardly and inwardly from the top of the flange means, and said second slots having outwardly open ends and downwardly and rearwardly slot portions cooperating with the pin means to hold the housing on the mount adjacent the support.

21. The assembly of claim 19 wherein: said pin means comprise a pair of upper pins on the side wall portions of the housing and located in said first slots and a pair of lower pins secured to said side walls located in said second slots.

22. The assembly of claim 19 wherein: the latch means includes a horizontal lip secured to the mount and lock means mounted on the housing, said lock means having a member engageable with the lip to hold the housing in a non-releasable position on the mount, said member being moved to a position out of engagement with the lip whereby the housing can be removed from the mount.

23. The assembly of claim 22 wherein: the lock means comprise a pair of key operated locks, each lock having a member engageable with the lip, each member being movable to a position out of engagement whereby the housing can be removed from the mount.

24. The assembly of claim 18 wherein: each of said flange means extends substantially the length of a side wall.

* * * * *